United States Patent [19]
Schaupp

[11] Patent Number: 5,431,274
[45] Date of Patent: Jul. 11, 1995

[54] ROTARY ELECTRONIC PROFILE PLACER

[75] Inventor: Richard E. Schaupp, Modesto, Calif.

[73] Assignee: HMS Label Specialties, Inc., Minneapolis, Minn.

[21] Appl. No.: 70,514

[22] Filed: Jun. 2, 1993

[51] Int. Cl.[6] .............................. B65G 47/84
[52] U.S. Cl. .............................. 198/474.1; 198/464.3; 156/571; 156/DIG. 31
[58] Field of Search ............... 198/464.3, 474.1, 476.1, 198/477.1; 156/571, DIG. 31

[56] References Cited

U.S. PATENT DOCUMENTS 2,823,816  2/1958  Eddison .................... 198/476.1
4,530,686  7/1985  Everson et al. .
4,643,633  2/1987  Lashyro .
4,901,843  2/1990  Lashyro .
5,112,430  5/1992  Hudson .
5,285,888  2/1994  Izume et al. .................. 198/464.3

Primary Examiner—Joseph E. Valenza
Attorney, Agent, or Firm—Kinney & Lange

[57] ABSTRACT

A rotary transfer device for placing and feeding articles includes a main rotating body, a motor coupled to the main rotating body, a center gear, a planetary gear, an article transfer mechanism and a servo motor. The rotating drive body motor rotates the main rotating body about an axis. The center gear continuously rotates about the axis. The planetary gear rotates with the main rotating body and is in rotational communication with the center gear. The article transfer mechanism rotates with the planetary gear and has at least one apex position of travel. The servo motor is in communication with the center gear and varies the continuous rotational velocity of the center gear to vary rotational velocity of the planetary gear.

29 Claims, 6 Drawing Sheets

ROTARY ELECTRONIC PROFILE PLACER

BACKGROUND OF THE INVENTION

The present invention relates to rotary placers used for the feeding of labels, cartons and related products. In particular, this invention relates to a rotary transfer device having a servo motor for varying the rotational movement of an article transfer mechanism.

Typical rotary transfer devices include a rotating main body and arms which rotate on centers radially disposed around the center line of the rotating main body. Each arm is equipped with picking and holding devices. Rotation of the arms is normally controlled by gearing or by belts. The picking devices normally travel through at least two phases: a picking phase and a placing phase. During the picking phase, the article transfer mechanism picks up an article from a feeder or other fixed point. During the placing phase, the article transfer mechanism places the article in a new location, such as on a package.

An example of such a rotary transfer device is disclosed in U.S. Pat. No. 4,530,686, entitled "ROTARY PACKAGING TECHNOLOGY." With this rotary transfer device, the arms are coupled to planetary gears which rotate about relative to a stationary center or sun gear. The ratio of the stationary sun gear to the planet gear, which rotates about the sun gear in the main body, imparts a secondary rotating motion to the arms. Gripping devices are mounted to the end of the arms. The value of the ratio between the sizes of the planet gear and the sun gear and the length of the arms determines the path or the profile of an end gripping device.

Typically, as shown by U.S. Pat. No. 4,530,686, the arrangement of ratios and arm lengths is established so that the gripping device travels through two or three fixed point apex locations in the cycloidal motion of the gripper device. As the gripper device or cup approaches each fixed point, there is little radial travel about the main rotating body axis or center line. However, a large amount of travel on a linear axis from the main body center toward the fixed point exists. As the main body continues to rotate, the gripper device retracts along a similar path.

This type of motion profile, a fixed-point profile, is commonly used because it facilitates picking up an object or article from a stationary feeding system or picking station and placing the article at a fixed point. Although the motion profile appears to stop at fixed points, the profile is actually comprised of rotary paths. As a result, the gripping device travels in one rotational direction at a constant rate. Because of the constant direction and rate, this type of rotary transfer device is well-suited for high speeds.

Although such a rotary transfer device is well-suited to picking up and placing at fixed points, rotary transfer devices employing stationary center gears are less than ideal where the object that the article is to be placed on is moving. The problem occurs because there is a difference in the relative motion during the placing phase between the gripping device and the object. The greater the pitch or spacing between products and the relative product travel during the placing phase, the worse the problem. Although the fixed-point motion profile of the gripping device could be altered to better coordinate the relative motions of the gripper device and the moving object, the altered motion profile would also be created at the picking station where the fixed-point profile is required.

Thus, the placement of articles such as coupons or labels to or on moving objects, such as packages encounters several problems. The relative movement between the individual article and the moving object causes inherent placement difficulties and damage. This problem is accentuated in high-speed placement operations.

In an attempt to solve this problem, U.S. Pat. No. 4,901,843, entitled "ADVANCING MOTION ROTARY APPARATUS" discloses a rotary transfer device having a timed and intermittently reciprocating center gear. With this device, the center gear is reciprocated clockwise, and then counterclockwise to accelerate the rotational movement of the gripping device at its apex to cause the gripping device to travel at the same speed as the moving object, i.e., a placing profile, during the placing phase. The reciprocating or oscillating motion of the center gear is created by a cam and a linkage mechanism communicating between the cam and the center gear. Movement of the center gear is controlled by the cam timed to the rotating main body so as to retard and advance the gripper device during the placing phase.

During the picking phase, the center gear is stationary while the planetary gear rotates about the center gear. Because the planetary gear has a radius one-half the radius of the center gear (a mechanical 2:1 gearing ratio), the planetary gear and the gripper device complete two full rotations for every single rotation of the rotating main body. During the picking phase, the center gear of this device operates almost identical to the device described in U.S. Pat. No. 4,530,686.

Several disadvantages are also associated with this rotary transfer device. For example, when the pitch or frequency of the moving objects changes, the placing profile must also be changed. To change the placing profile, the cam must be physically removed and replaced. In addition, because the cam and the center gear must reciprocate, that is, move in one direction, stop, and reverse direction, the rotary transfer device requires more energy to overcome inertia involved in stopping and starting a mass. Consequently, the motion profile is not as smooth as continuous motion in one direction. Moreover, because of the reciprocating nature of this rotary transfer device, high-speed performance is compromised or is limited.

SUMMARY OF THE INVENTION

The present invention is a rotary transfer device for placing and feeding articles. The rotary transfer device includes a main rotating body, a main rotating body drive motor, a center gear, a planetary gear, an article transfer mechanism and a servo motor. The main rotating body drive motor is coupled to the main rotating body and rotates the main rotating body about an axis. The center gear has continuous rotational movement about the axis. The planetary gear rotates with the main rotating body and is in rotational communication with the center gear. The article transfer mechanism rotates with the planetary gear and has at least one apex position of travel. The servo motor is in communication with the center gear. The servo motor varies the continuous rotational velocity of the center gear to vary rotational velocity of the planetary gear.

DETAILED DESCRIPTION OF THE PREFERRED EMBODIMENTS

Figure 1:
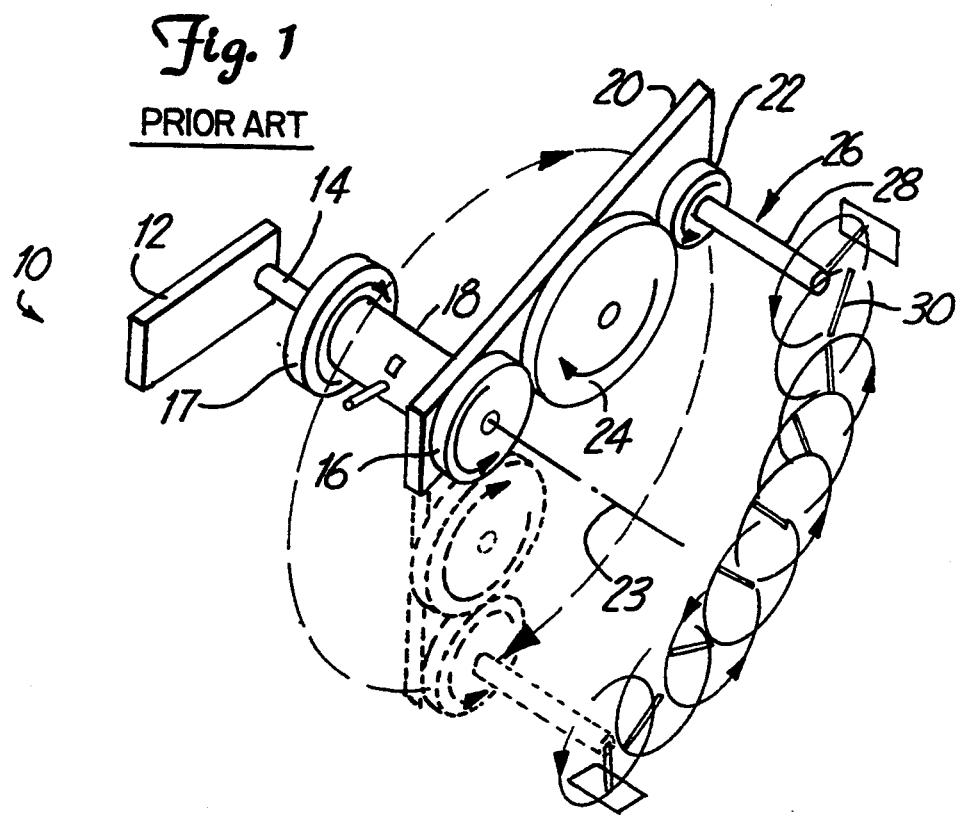
FIG. 1 is a perspective view of a prior art rotary placer.

FIG. 1 shows prior art rotary transfer device 10 used for the feeding of labels, cartons and related products. Rotary transfer device 10 includes arm 12, stationary shaft 14, stationary sun gear or center gear 16, drive cylinder 18, main rotating plate or body 20, planetary gear 22, intermediate gear 24 and article transfer mechanism 26. As is known in the art, stationary shaft 14 extends from stationary arm 12 through drive shaft 18 and is coupled to stationary center gear 16. Arm 12 and shaft 14 hold and maintain center gear 16 in a stationary position. At the same time, drive cylinder 18 is permitted to rotate about stationary shaft 14. Drive cylinder 18 is further coupled to main rotating body 20. Consequently, upon rotation of drive cylinder 18 by any suitable means such as motors or the like as conventionally known in the art, rotating body 20 is rotated about an axis 23 established by stationary shaft 14. Planetary gear 22 is generally cylindrical. Planetary gear 22 is rotatably coupled to main rotating body 20. As a result, planetary gear 22 rotates with main body 20 about the axis 23 established by shaft 14.

Intermediate gear 24 is generally cylindrical. Intermediate gear 24 is rotatably coupled to main body 20 between center gear 16 and planetary gear 22. Intermediate gear 24 is rotatably coupled to main body 20 so as to be in meshing engagement with both center gear 16 and planetary gear 22. Intermediate gear 24 rotates with main body 20 about axis 23. Because intermediate gear 24 is rotatably coupled to main body 20 and is in meshing engagement with stationary center gear 16, intermediate gear 24 also rotates about stationary center gear 16 as main body 20 rotates about axis 23. Because intermediate gear 24 is also in meshing engagement with planetary gear 22, rotation of intermediate gear 24 drives planetary gear 22 to cause planetary gear 22 to rotate about the center gear 16.

Article transfer mechanism 26 is mounted to planetary gear 22. Article transfer mechanism 26 typically has an outward extending shaft 28, a gripper or transfer arm 30 and a picking and placing device such as a suction cup secured to an end of arm 30. Because shaft 28 and arm 30 are coupled to planetary gear 22, rotation of planetary gear 22 causes shaft 28 and arm 30 to rotate. Because arm 30 extends away from an axis established by shaft 28, arm 30 rotates through an apex position where an end of arm 30 is at its outermost distance away from the axis 23 established by stationary shaft 14.

Figure 2:
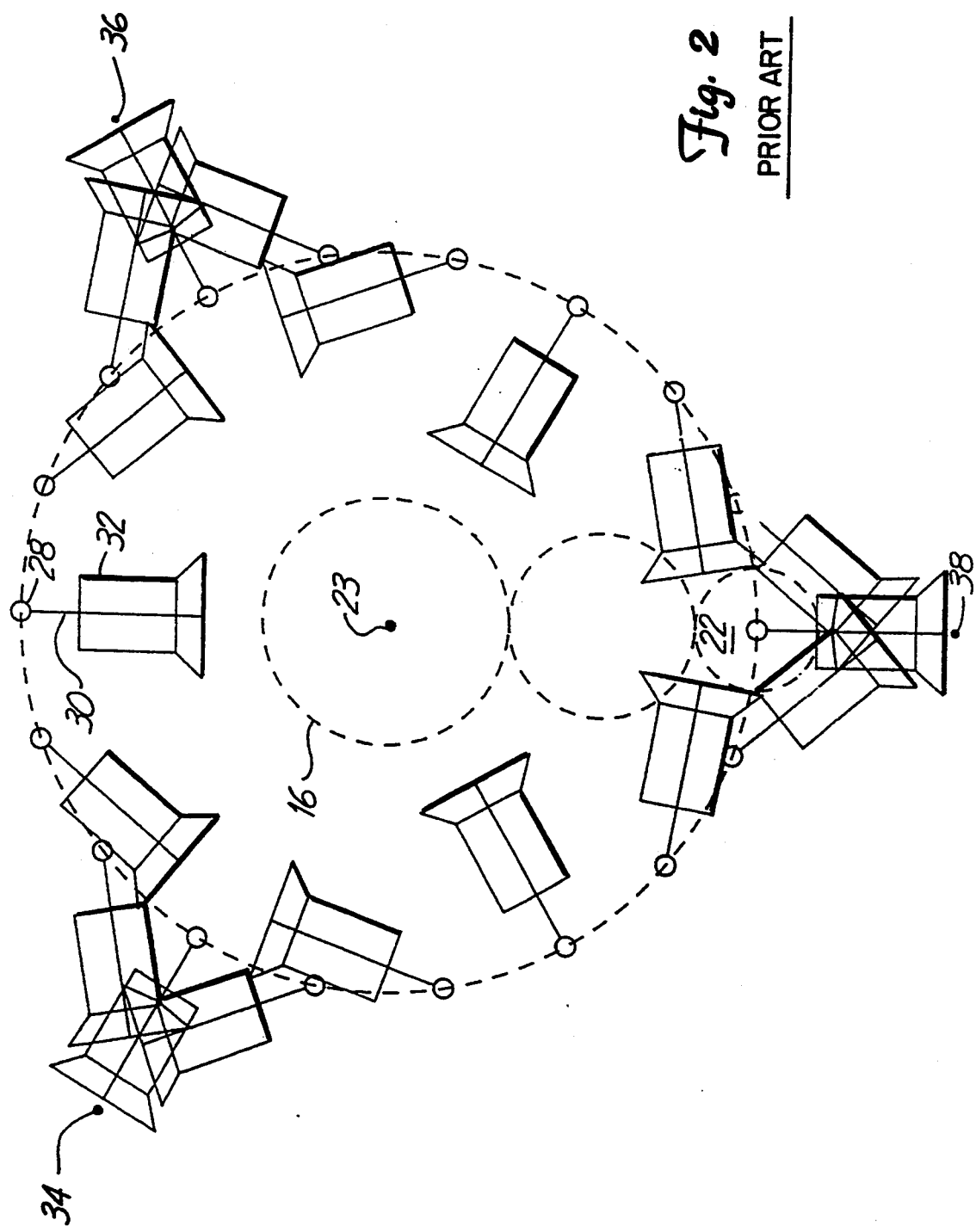
FIG. 2 is a diagram showing a motion profile of the prior art rotary placer of FIG. 1.

FIG. 2 shows a path or rotational profile of a gripping device or suction cup 32 of rotary transfer device 10. As best shown in FIG. 2, the ratio between the size of center gear 16 to the size of planetary gear 22 imparts a secondary rotating motion to arms 30. The ratio between the size of center gear 16 to planetary gear 16 and length of arms 30 determines the path or profile of vacuum cup 32 which is mounted at an end of arms 30. Particularly, the ratios and the lengths of arms 30 are arranged so as to provide for two or three locations in cycloidal motion of vacuum cup 32 where vacuum cup 32 travels to a fixed point. The ratio of center gear 16 to planetary gear 22 is 2:1. as a result, vacuum cup 32 has a profile where vacuum cup 32 travels through three fixed points, 34, 36, 38. As vacuum cup 32 approaches each fixed point, there is very little radial travel about axis 23. At the same time, a large amount of travel occurs on a linear axis to the fixed point. As the main rotating body (not shown) continues to rotate, cup 32 retracts along a similar path. The motion profile shown in FIG. 2 is commonly used because it facilitates picking up an object or a label from a stationary feeding system, such as fixed point 36, and placing the object at another fixed point, such as fixed point 38.

With the fixed-point motion profile shown in FIG. 2, the main rotating body (not shown) rotates clockwise, thereby, causing rotating shaft 28 to rotate with the main body about axis 23 in a clockwise direction. At the same time, cup 32 rotates in a counterclockwise direction about an axis established by rotating shaft 28. The counterclockwise rotation of cup 32 substantially equals the clockwise rotation of main rotating body (not shown) at the apex of travel of cup 32. Consequently, vacuum cup 32 appears to stop at fixed points 34, 36, 38. In reality, the motion profile is comprised of rotary paths which always travel in a constant rotational direction at a constant rate. Because of the constant direction and rate, this type of system is well suited for high speeds.

Although stationary center gear of rotary transfer device 10 has a fixed-point motion profile well suited to picking up and placing articles at fixed points 34, 36, 38. The motion profile of rotary transfer device 10 is not well suited to picking up articles at a fixed point and placing articles onto moving objects, such as packages traveling on a conveyer.

Figure 3:
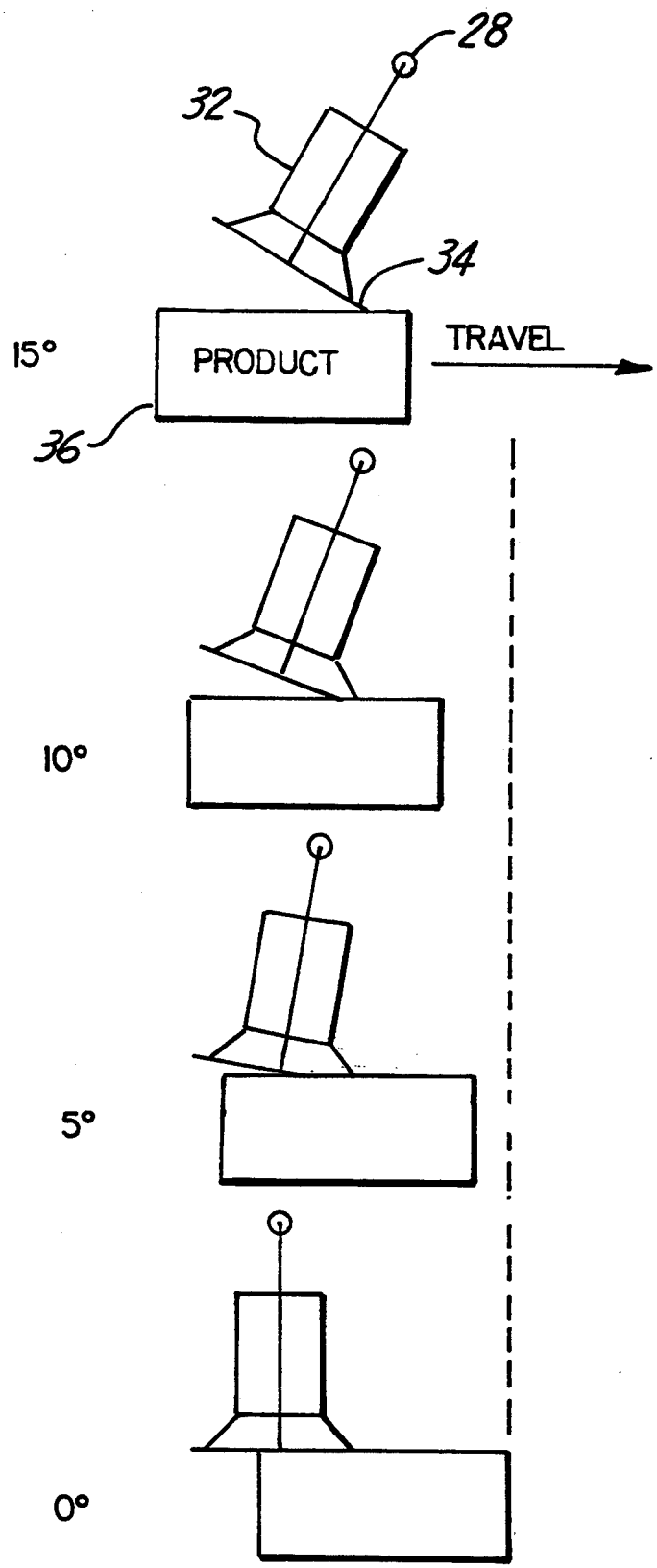
FIG. 3 is a diagram showing placement of an article on a moving object by the rotary placer of FIG. 1.

FIG. 3 illustrates a motion profile of cup 32 as cup 32 places an article or label 34 onto package or product 36 which is linearly traveling to the right. To produce a fixed-point profile so that cup 32 is able to pick up label 34 at a stationary fixed feeder, the counter clockwise rotation of cup 32 substantially equals the clockwise rotation of rotating shaft 28 with the main rotating body (not shown) at the apex of travel of cup 32. Unfortunately, because the rotational movement of cup 32 is at a constant speed, there is difference in relative motion between the rotation of cup 32 and the traveling rate of product 36 while label 34 is placed upon product 36. The problem occurs because cup 32 has a fixed-point profile while product 36 is moving. Generally, the greater the pitch or spacing between the products and the higher the speed of product 36 during the placing phase, the worse the problem. As FIG. 3 illustrates, the difference in relative motion between cup 32 and product 36 causes label 34 to be misplaced and not centered upon product 36.

Figure 4:
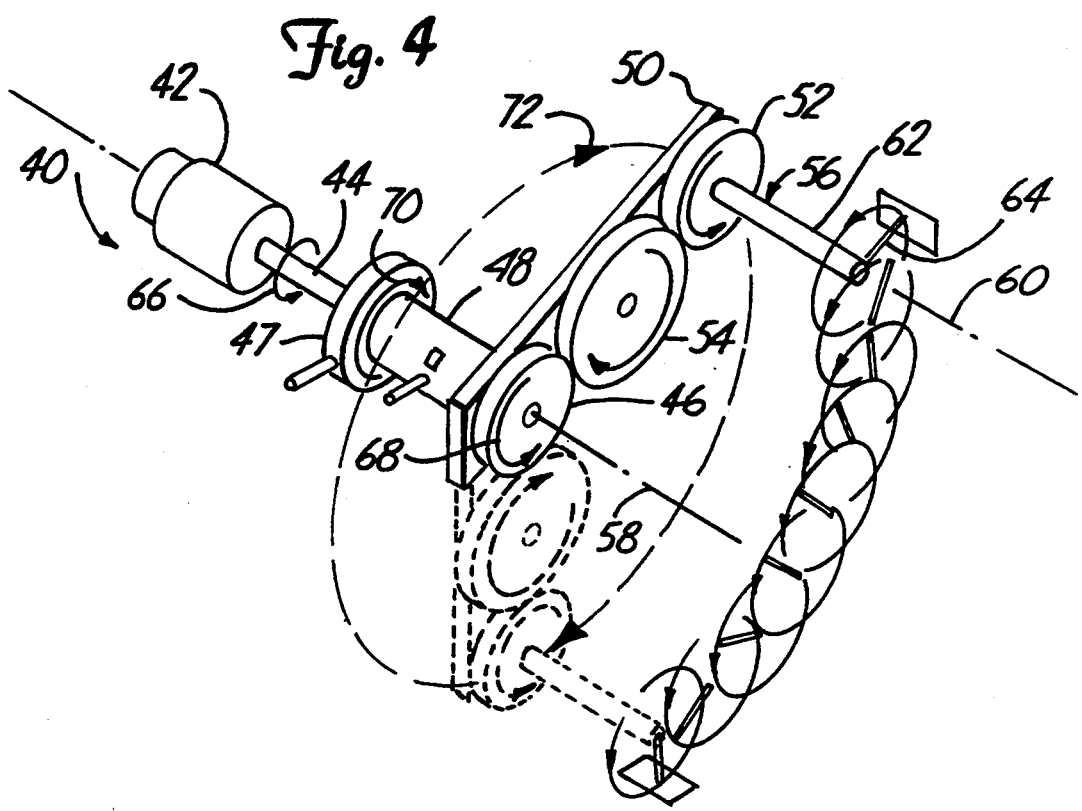
FIG. 4 is a perspective view of a rotary placer of the present invention.

FIG. 4 shows an improved rotary placer 40 of the present invention. Rotary placer 40 includes motor 42, rotatable shaft 44, rotatable sun gear or center gear 46, main rotating body drive motor 47, drive cylinder 48, supporting plate structure or main rotating body 50, planetary gear 52, intermediate gear 54 and article transfer mechanism 56. Motor 42 preferably comprises a servo motor, but may also comprise a stepper motor, both of which are well known in the art. Motor 42 rotates rotatable shaft 44 and rotatable center gear 46 about axis 58 established by shaft 44. As is known in the art, servo motors are able to sense or determine their own location or position. Thus, motor 42, when a servo motor, is able to sense positions of center gear 46 and, therefore, positions of article transfer mechanism 56. Motor 42, when a stepper motor, preferably rotates in steps of 0.18°, but can rotate at any desired step. Because motor 42 is not required to rotate at a constant velocity, motor 42 may be controlled so as to rotate rotatable shaft 44 and rotatable center gear 46 at varying rotational velocities during rotation of shaft 44 and center gear 46.

Rotatable shaft 44 is coupled between motor 42 and center gear 46. Shaft 44 extends through drive cylinder 48 and through main rotating body 50. Because shaft 44 is coupled to center gear 46, rotation of shaft 44 by motor 42 causes rotation of center gear 46.

Center gear 46 is generally disc shaped and has a radius. Center gear 46 is fixedly coupled to shaft 44. Center gear 46 is in meshing engagement with intermediate gear 54. Alternatively, center gear 46 is in frictional engagement with intermediate gear 54. Rotation of shaft 44 causes center gear 46 to rotate about axis 58.

Main rotating body drive motor 47 comprises a typical motor as is known in the art. Drive motor 47 is coupled to drive cylinder 48. Drive motor 47 rotatably drives drive cylinder 48 and main rotating body 50 at a continuous rotational velocity. Alternatively, drive cylinder 48 and main rotating body 50 may be rotated by any conventional rotating means as are known in the art.

Drive cylinder 48 is generally cylindrical and hollow so as to permit shaft 44 to extend through cylinder 48. Drive cylinder 48 is coupled between drive motor 47 and main rotating body 50. Rotation of drive cylinder 48 by drive motor 47 drives main rotating body 50 so that main rotating body 50 rotates about axis 58.

Main rotating body 50 is generally linear having a first end coupled to drive cylinder 48 and a second end distant from drive cylinder 48. Rotation of main rotating body 50 about axis 58 by drive cylinder 48 causes planetary gear 52 and intermediate gear 54 to also rotate about axis 58.

Planetary gear 52 is generally disc shaped and has a radius the same as the radius of center gear 46. Planetary gear 52 is rotatably coupled to the second end of main rotating body 50 along an axis 60. Planetary gear 58 is in rotational communication with center gear 46. Rotation of main rotating body 50 causes planetary gear 52 to rotate about axis 58. At the same time, planetary gear 52 also rotates about axis 60. Thus, planetary gear 52 imparts a secondary rotational motion to article transfer mechanism 56.

Intermediate gear 54 is generally disc shaped and is rotatably coupled to main rotating body 50. Intermediate gear 54 is positioned so as to be in meshing engagement with center gear 46 and planetary gear 52. Alternatively, intermediate gear 54 is in frictional engagement with center gear 46 and planetary gear 52. Intermediate gear 54 provides rotational communication between planetary gear 52 and center gear 46 while separating axis 58 from axis 60.

Article transfer mechanism 56 is coupled to planetary gear 52 and includes planetary shaft 62 and gripper arm 64. Planetary shaft 62 is generally cylindrical and has a journaled end coupled to planetary gear 52. Gripper arm 64 extends outward from an end opposite of the journaled end of planetary shaft 62. An outer end of gripper arm 64 includes a gripping device or mechanism such as a suction cup (not shown). Rotation of planetary gear 52 causes planetary shaft 62 and gripper arm 64 to rotate about axis 60.

In operation, motor 42 drives shaft 44 and center gear 46 at continuous, but varied, velocities in a counterclockwise direction about axis 58 as indicated by arrows 66 and 68. At the same time, drive motor 47 drives drive cylinder 48 and main rotating body 50 to rotate main rotating body 50 in a clockwise direction about axis 58 as indicated by arrows 70 and 72. Because planetary gear 52 and center gear 68 have a mechanical 1:1 gear ratio (planetary gear 52 has a radius equal to the radius of center gear 68), planetary gear 52 will complete a full rotation about axis 60 for every full rotation of main rotating body 50 about axis 58 when center gear 46 is not rotated. Likewise, rotation of center gear 46 at the same rotational velocity as main rotating body 50 (a 1:1 center gear to main rotating body counter rotation ratio), but in a counter direction, will eliminate any rotation of planetary gear 52 about axis 60. To produce a three-stop, fixed-point profile (two full rotations of planetary gear 52 for every single rotation of main rotating body 50) of planetary gear 52 and attached article transfer mechanism 56, center gear 46 is rotated in a counter direction at a 2:1 ratio relative to the rotation of main rotating body 50.

A 2:1 center gear to main body counter rotation ratio produces a three-stop, fixed-point profile. A less than 2:1 sun gear to main body counter rotation ratio produces a retarding profile. A retarding profile is one where planetary gear 52 rotates at a slower velocity than a fixed-point profile. A greater than 2:1 sun gear to main body counter rotation ratio produces an advancing profile. Likewise, an advancing profile is one where planetary gear 52 rotates at a faster velocity than the fixed-point profile.

Because motor 42 rotates center gear 46, the center gear to main body counter rotation ratio may be electronically varied to follow, retard or advance the planetary and the gripper arm motion profile relative to a fixed-point motion profile. As a result, motor 42 may be electronically controlled to rotate center gear 46 at a center gear to main body counter rotation ratio so as to cause gripper arm 64 to rotate at a fixed-point profile while picking or placing objects from or onto a fixed point or location and so that gripper arm 64 is rotated at an advancing profile during placement of an article onto a moving object such as a package on a conveyor. As a result, rotary placer 40 is well suited for high-speed placement of articles such as labels onto moving objects.

In addition, motor 42 may be electronically controlled to rotate center gear 46 at a center gear to main body counter rotation ratio so as to cause gripper arm 64 to rotate at one advancing profile while picking articles such as labels from a moving feeder device and so that gripper arm 64 is rotated at a second different advancing profile during placement of the article onto a moving object such as a package on a conveyer. Rotary placer 40 is also well suited for high-speed of articles from moving feeders.

Figure 5:
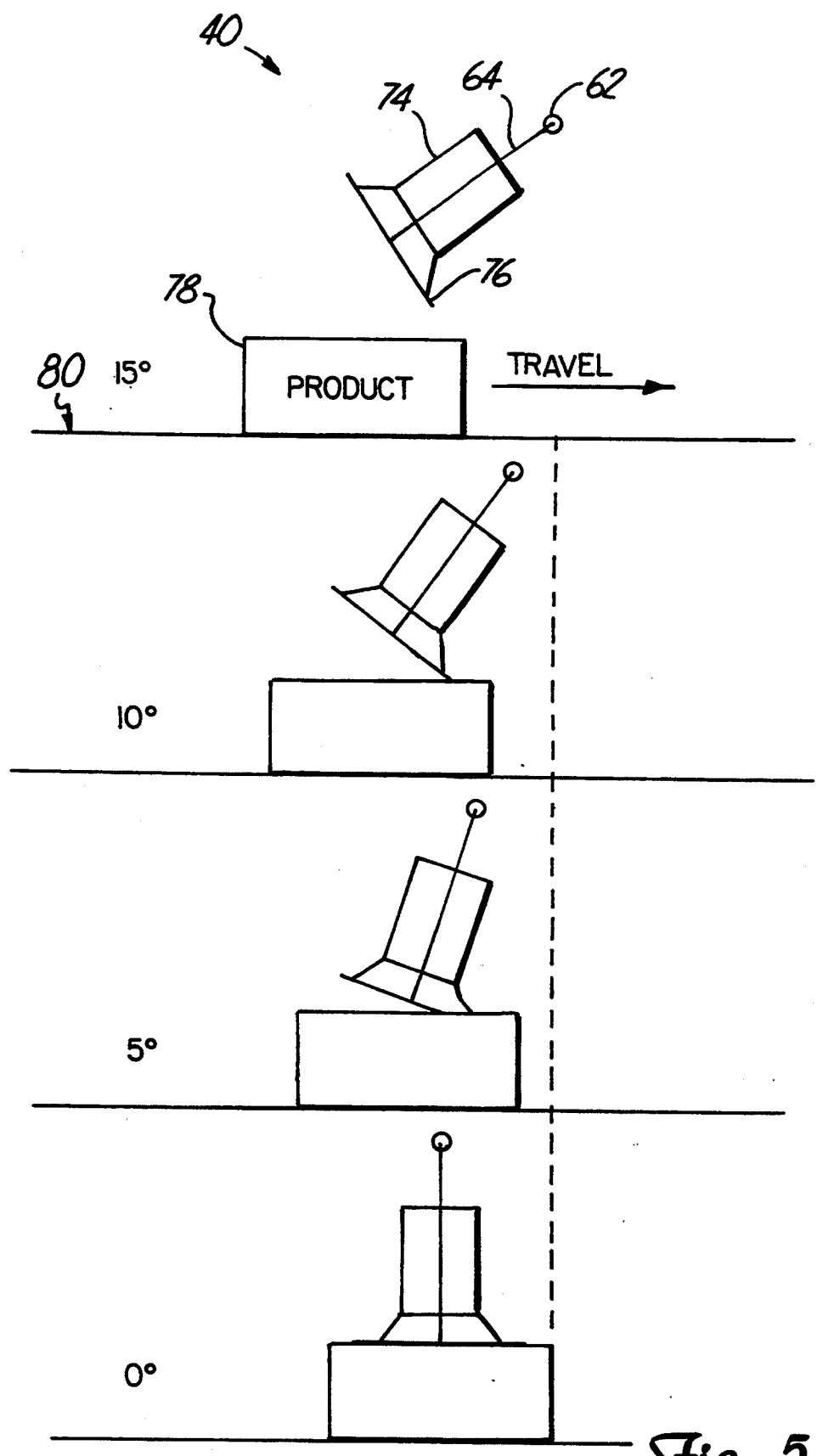
FIG. 5 is a diagram showing placement of an article upon a moving object by the rotary placer of FIG. 4.

FIG. 5 shows gripper arm 64 and a gripping device such as suction cup 74 coupled to an end of gripper arm 64 as cup 74 places an article such as coupon or label 76 on an object or a product 78 carried by conveyor 80. As best shown by FIG. 5, rotary placer 40 accurately places label 76 on product 78. Prior to the placement of label 76 onto product 78, motor 42 rotates center gear 46 at a less than 2:1 center gear to main body counter rotation ratio to cause gripper arm 64 and suction cup 74 to move with a retarding motion profile. Thus, the rotational velocity of gripper arm 64 and suction cup 74 is decelerated prior to the placement of label 76 onto product 78. As suction cup 74 places label 76 onto product 78, motor 42 rotates center gear 46 at a greater than 2:1 center gear to main body counter rotation ratio to produce an advancing profile which is synchronized with the movement of product 78. As a result, the difference in relative motion between cup 74 and product 78 is minimized or eliminated. Thus, label 76 is more accurately placed upon moving product 78.

After label 76 is placed upon product 78, motor 42 rotates center gear 46 at a less than 2:1 center gear to main body counter rotation ratio to cause gripper arm 64 and suction cup 74 to move at a retarding-motion profile. The center gear to main body counter rotation ratio is such that gripper arm 64 and cup 74 are decelerated and are placed in phase with a fixed-point profile. Thereafter, motor 42 rotates center gear 46 at a 2:1 center gear to main body counter rotation ratio so that gripper arm 64 and cup 74 move with a fixed-point profile while another label is picked during a picking phase.

Rotary placer 40 is well suited for high-speed performance. Because motor 42 electronically alters or varies the center gear to main body counter rotation ratio by rotating center gear 46 in only one direction at varying ratios, motion profiles for fixed-point, retarded and advancing motion profiles can be established without any element in rotary placer 40 needing to stop or reverse direction. Because no element of rotary placer is reciprocated or oscillated, rotary placer 40 reduces inertia loads and power requirements while achieving smoother operation and improved high-speed performance.

Moreover, because the motion profile of gripper arm 64 and suction cup 74 are electronically controlled by the rotation of center gear 46 by motor 42, the motion profile of gripper arm 64 and cup 74 may be tuned or changed to accommodate different product pitch centers. Moving or changing the motion profile requires only software changes, not physical part (cam) replacement. As a result, rotary placer 40 is more easily adaptable to different product pitches and velocities.

As can be appreciated, main rotating body 50 may have a variety of shapes and forms, including oval, rectangular and triangular shapes. Moreover, rotational communication between planetary gear 52 and center gear 46 may be achieved by several alternatives. For example, a cogged belt pulley between center gear 46 and planetary gear 52 is appropriate. In addition, main rotating body drive motor 47 may also consist of a stepper or servo motor, as is known in the art.

Figure 6:
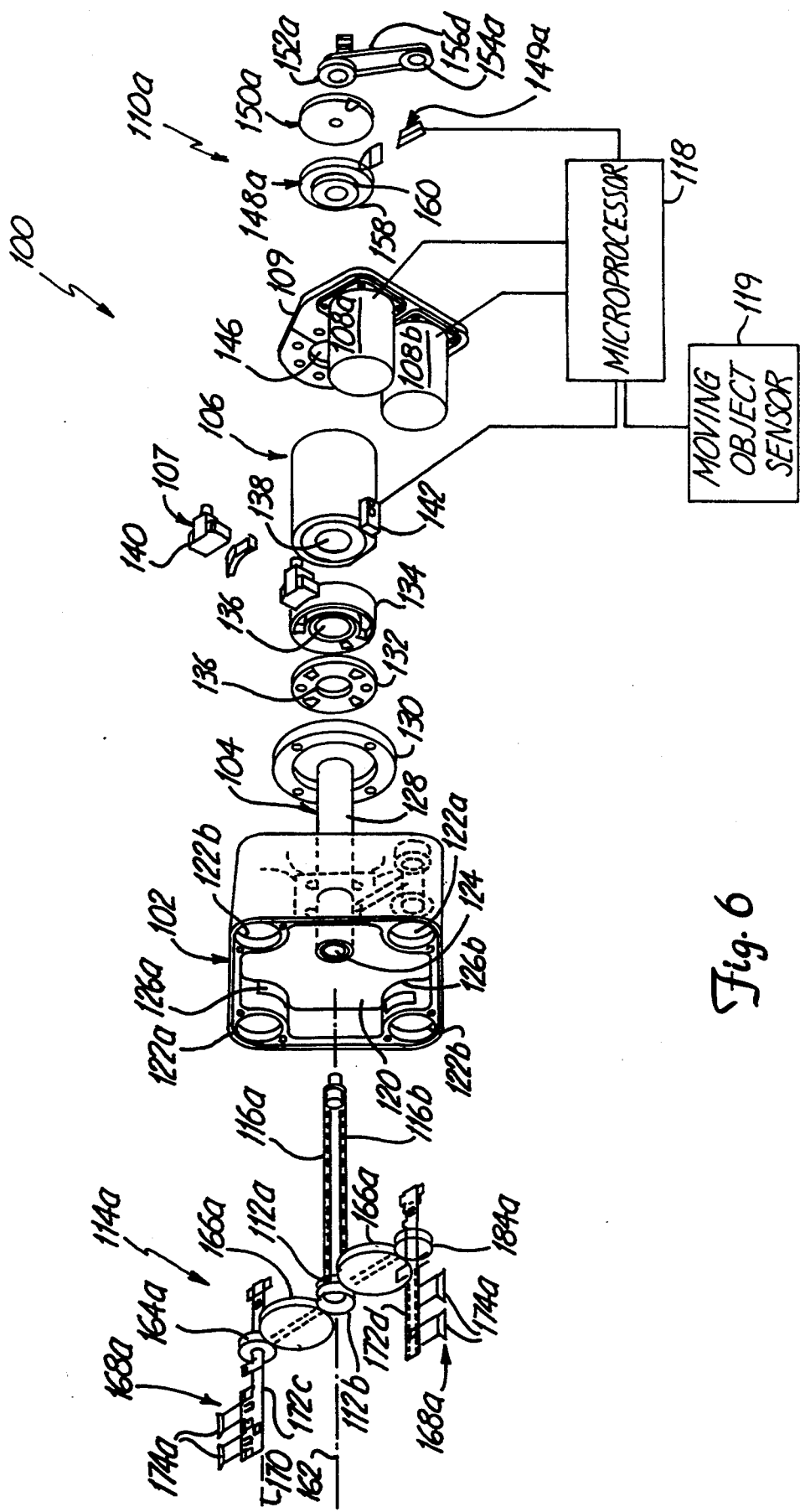
FIG. 6 is an exploded perspective view of a second embodiment of a rotary placer of the present invention.

FIG. 6 shows an exploded perspective view of a multiple gripper arm rotary placer 100. Rotary placer 100 generally includes main rotating body 102, drive cylinder 104, drive motor 106, motors 108a, 108b, support plate 109, two gearing assemblies 110 center gears 112a, 112b, two pairs of rotating planet assemblies 114 rotatable shafts 116a, 116b, microprocessor 118 and moving object sensor 119. For ease of illustration, only one gearing assembly 110 and one pair of rotating planet assemblies 114 are shown.

Main rotating body 102 is a generally rectangular housing and includes main cavity 120, planetary bores 122, central bore 124 and planetary slots 126a, 126b. Main cavity 120 extends into a front face of main rotating body 102. Main cavity 120 is generally cross-shaped and has a depth sufficient to partially contain center gears 112 and planet assemblies 114. Planetary bores 122a, 122b extend into the front face of main rotating body 102 and are located at outermost points along the perimeter of main rotating body 102. Because main rotating body 102 is rectangular in shape, planetary bores 122a, 122b are located diagonally across from one another at four corners of main rotating body 102. Planetary bores 122a are located at opposite corners of body 102. Likewise, planetary bores 122b are located diagonally across from one another at opposite corners of body 102. Planetary bores 122a have a depth nearly the same as the depth of main cavity 120. Planetary bores 122b have a depth less than the depth of planetary bores 122a. Central bore 124 extends from the center of main cavity 120 through main rotating body 102. Planetary slots 126a, 126b communicate between main cavity 120 and planetary bores 122a, 122b, respectively.

Drive cylinder 104 is generally cylindrical in shape and includes shaft 128, lower plate 130, intermediate plate 132 and motor coupling member 134. Shaft 128 is coupled to a rear face of main rotating body 102 at one end. Shaft 128 is coupled to lower plate 130 at a second end. Lower plate 130 is cylindrical and is mounted to intermediate plate 132. Intermediate plate 132 is cylindrical and is mounted to motor coupling member 134. Motor coupling member 134 is cylindrical and rotatably mounts drive shaft 128 to main rotating body drive motor 106. Cylinder 128, lower plate 130, intermediate plate 132 and motor coupling member 134 each include inner bores 136 which are in coaxial alignment with one another and which are in coaxial alignment with central bore 124.

Main rotating body drive motor 106 is a typical motor as is known in the art. Drive motor 106 has a hollow central core 138 in coaxial alignment with inner bore 136 and central bore 124. Motor 106 is rotatably coupled to rotor coupling member 134 of drive shaft 104. Motor 106 rotatably drives rotor coupling member 134 and drive shaft 104 to rotate main rotating body 102.

Rotary encoder or main rotating body sensor 107 includes index 140 and sensor element 142. Index 140 is coupled to rotor coupling member 134 of drive shaft 104. Sensor element 142 is coupled to drive motor 106. As is known in the art, sensor element 142 detects positions of drive shaft 104 and main rotating body 102.

Motors 108a, 108b preferably comprise stepper motors as are known in the art. Alternatively, motors 108a and 108b comprise servo motors. Motors 108a, 108b rotate in short and essentially uniform angular movements rather than continuously. Motor 108a is operably coupled to gearing assembly 110a. Motor 108a rotates gearing assembly 110a at varying rotational velocities. Motor 108a is operably coupled to a second gearing assembly (not shown) similar to gearing assembly 110a. Motors 108a, 108b are mounted to support plate 109.

Support plate 109 is generally flat and includes circular hole 146 in coaxial alignment with inner core 138 of drive motor 106. Support plate 109 is fixedly coupled to drive motor 106. Support plate 109 supports drive motor 106 and motors 108a, 108b in fixed positions.

Gearing assembly 110a provides rotational communication between motor 108a and rotatable shaft 116a and includes rotatable shaft coupling member 148a, shaft sensor 149a, intermediate plate 150a, central cam 152a, outer cam 154a and belt 156a. Rotary placer 100 further includes a second gearing assembly (not shown) similar to gearing assembly 100a. The second gearing assembly is coupled between motor 108b and rotatable shaft 116b. The second gearing assembly provides rotational communication between motor 108b and shaft 116b.

Rotatable shaft coupling member 148a is a circular disk having a concentrically located hole 158 which is in coaxial alignment with hole 146 of support plate 109. Coupling member 148a includes neck 160. Neck 160 protrudes from a front face of member 148a. Neck 160 fits within hole 146 of support plate 109. Neck 160 centers member 152b and insures that hole 158 is in coaxial alignment with hole 146. Hole 158 receives rotatable shaft 116a to couple shaft 116a to gearing assembly 110a. Intermediate plate 150a is coupled to rotatable shaft coupling member 148a.

Rotatable shaft sensor 149a is well known in the art and is coupled to coupling member 148a and to microprocessor 118. Shaft sensor 149a senses the position of rotatable shaft 116a and, thus, the position of rotating planet assemblies 114a. In lieu of shaft sensor 149a, motor 108a may consist of a servo motor which senses positions of rotatable shaft 116a.

Central cam 152a is generally disk shaped. Central cam 152a is coupled to intermediate plate 150a. Outer cam 154a is disk shaped and is coupled to motor 108a. Belt 156a extends between and encircles central cam 156b and outer cam 158b. As a result, motor 108a rotatably drives outer cam 154a at varying rotational velocities. Belt 156a in turn rotates central cam 150a, intermediate plate 150a and rotatable shaft coupling member 148a at varying rotational velocities.

Rotatable shafts 116a, 116b are generally cylindrical shaped and extend between center gears 112a, 112b, respectively, and gearing assemblies 110. Rotatable shaft 116b is concentrically positioned within rotatable shaft 116a and is coupled to center gear 112b. Rotatable shaft 116a is coupled to center gear 112a. Rotatable shaft 116a surrounds rotatable shaft 116b and is coupled to center gear 112a. Rotatable shaft 116a and 116b extend through central bore 124, inner holes 136, inner core 138 and hole 146 to couple with gearing assemblies 112. As a result, rotatable shaft 116a, 116b permit rotation of center gears 112a, 112b at varying rotational velocities.

Center gears 112a, 112b are generally disk shaped and have a radius. Center gear 112a is fixedly coupled to rotatable shaft 116a. Center gear 112b is fixedly coupled to rotatable shaft 116b. Rotation of shaft 116a and shaft 116b causes center gears 112a and 112b, respectively, to rotate about axis 162.

Rotating planet assembly 114 includes planetary gears 164a, intermediate gears 166b and article transfer mechanisms 168a. Planetary gears 164a are generally disk shaped and have a radius the same as the radius of center gear 112a. Planetary gear 164a is in rotational communication with center gear 112a. Planetary gears rotate about axis 170.

Upon assembly, planetary gears 164a are positioned within planetary bores 122a of main rotating body 102. Intermediate gears 166a extend through slots 126a so as to be in meshing engagement with center gear 112a and planetary gears 164a. Slots 122a restrict movement of planetary gears 164a to ensure that planetary gears 164a remain in engagement with intermediate gears 166a. Alternatively, intermediate gears 166a are frictional engagement with center gear 112a and planetary gears 164a. Intermediate gears 166a provide rotational communication between planetary gears 164a and center gear 112a while separating axis 162 from axis 170.

Article transfer mechanisms 168a are coupled to planetary gears 164a and include planetary shafts or gripper arms 172c, 172d and gripper devices 174a. Gripper arms 172c, 172d are generally cylindrical and have a journaled end coupled to planetary gears 164a. Gripper arms 172c and 172d are oriented at 180° about axis 162. Rotation of gripper arms 172c, 172d is individually determined by the rotational velocity of center gear 112a. Gripper devices 174a extend outward from an end opposite of the journaled end of gripper arms 172c, 172d. Gripper devices 174a typically comprise suction cups. Alternatively, other gripper devices as are known in the art may be used. Rotation of planetary gears 164a causes gripper arms 172c, 172d and gripper devices 174a to rotate about axis 170.

The velocity of center gears 112a, 112b is controlled by microprocessor 118. Microprocessor 118 is electrically coupled to drive shaft sensor 107, rotatable shaft sensor 149a, motors 108a, 108b and moving object sensor 119. Microprocessor 118 receives signals from sensor 107 representing the position of main rotating body 102. Microprocessor 118 receives signals from sensors 149a representing the position of gripper arms 172c, 172d. At the same time, microprocessor 118 receives signals representing the pitch and velocity of moving objects such as packages on a conveyor from moving object sensor 119. Alternatively, microprocessor 118 receives signals indicating the pitch and velocity of moving objects from software or from information manually entered into a keyboard.

Based on the sensed position of gripper arms 172 and main rotating body 102 and upon the inputted pitch and velocity of the moving objects, microprocessor 118 electrically controls motor 108a to vary the rotational velocity of center gears 112 and planetary gears 114. By controlling motors 108 to vary the rotational velocity of center gears 112 and planetary gears 164 based upon the sensed position of main rotating body 102 and gripper arms 172, microprocessor 118 coordinates the rotation of main rotating body 102 and article transfer mechanisms 114 so that article transfer mechanisms 168a travel at approximately the same velocity as the moving objects when article mechanisms 168a are placing articles such as coupons or labels onto the moving object. Microprocessor 118 electronically controls motors 108 to vary the rotational velocity of center gears 112 so that relative movement of article transfer mechanism 168a and the moving objects are synchronized during the placing phase. At the same time, microprocessor 118 electronically controls motor 108a to vary the rotational velocity of center gear 112a and planetary gears 164a so that article transfer mechanisms 168a have a fixed point profile during the picking phase.

Rotary placer 100 further includes an additional pair of rotating planet assemblies (not shown). The additional pair of rotating planet assemblies are identical to rotating planet assemblies 114a except that the additional pair of intermediate gears is in meshing or frictional engagement with center gear 112b, rather than 112a. In addition, the additional pair of intermediate gears, planetary gears and article transfer mechanisms are oriented at 90° with respect to rotating planet assemblies 114a. For sake of illustration, the additional pair of rotating planet assemblies are not shown.

Because rotary placer 100 includes two pairs of rotating planet assemblies: 114a and a second additional pair (not shown), placing speeds (unit/minutes) are increased without increasing the rotational velocity of main rotating body 102. Furthermore, because the rotational velocity of each pair is controlled by separate center gears 112a, 112b the motion profile of each pair may be individually controlled by individually varying the rotational velocities of each center gear 112a, 112b. As a result, article transfer mechanism 168a of rotating planet assembly 114a may follow a fixed point profile while the other rotating planet assembly (not shown) may be rotated so as to follow a matched motion or placing profile. By separately controlling the motion profile of each pair of rotating planet assemblies, each pair of planet assemblies has greater time to change from one profile to another profile. Thus, inertial loads and power requirements are reduced and high speed performance is improved.

Figure 7:
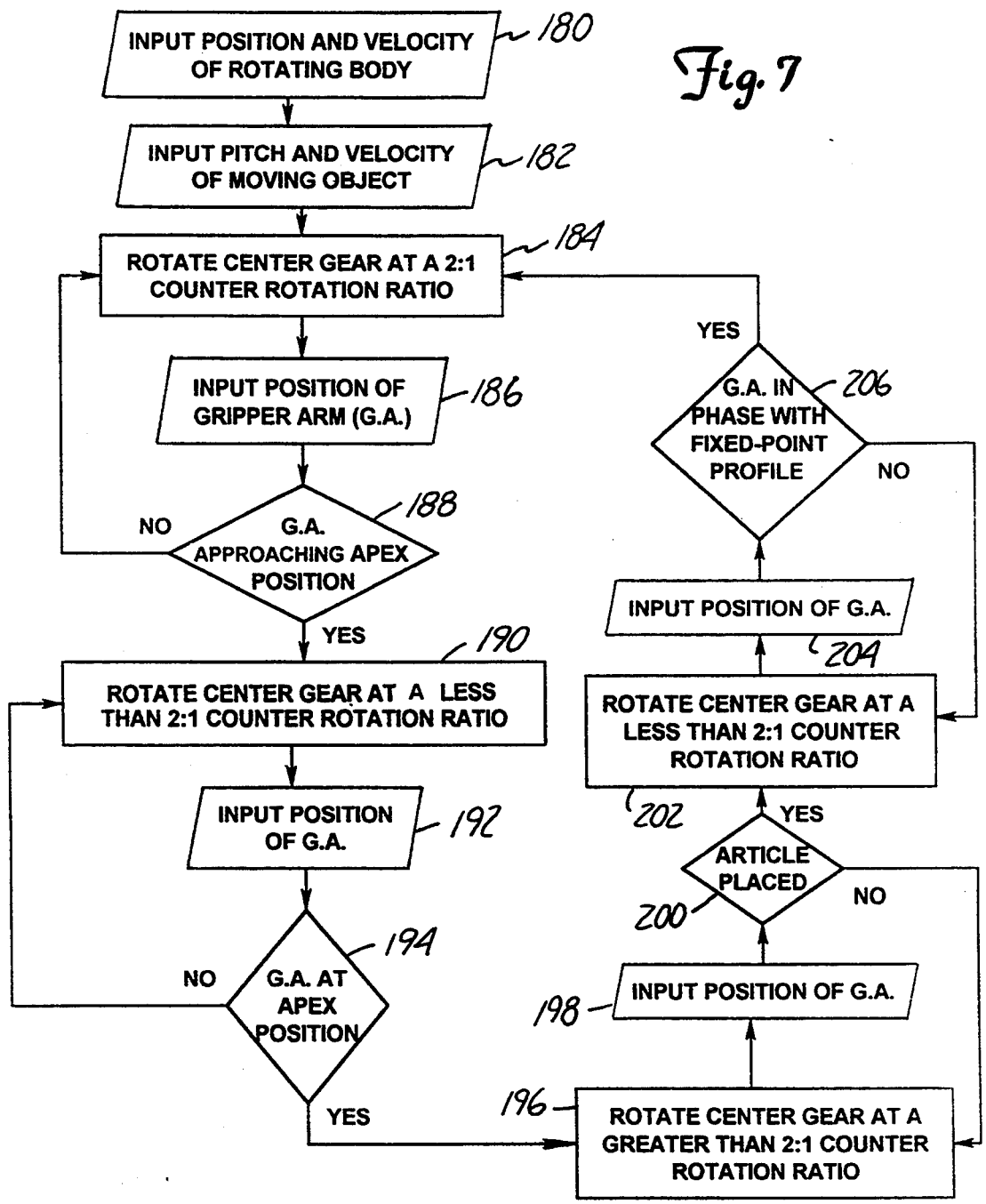
FIG. 7 is a flow diagram of step 4 synchronizing movement of a rotary placer with movement of moving objects.

FIG. 7 shows a flow diagram of steps performed by microprocessor 118 to coordinate and synchronize the rotation of gripper arms 172 so that gripper arms 172 rotate with a fixed point profile during the picking phase and so that gripper arms 172 rotate with an advancing profile or matching profile during the placing phase as articles are placed onto moving objects. As indicated by input blocks 180 and 182, microprocessor 118 receives inputted signals representing the position and the velocity of rotating body 102 and signals representing the pitch and velocity of moving objects, such as packages moving on a conveyor. Based upon the rotational velocity of rotating body 102, microprocessor 118 controls motor 108a to rotate center gear 112a at a 2:1 counter rotation ratio. This is represented by process block 184.

While microprocessor 118 electronically controls motor 108a to rotate center gear 112a at a 2:1 counter rotation ratio, microprocessor 118 continually receives signals from sensor 149a representing the position of motor 108a which indicates the position of gripper arms 172 and gripper devices 174. This is represented by input block 180.

Based upon the position of gripper arms 172 and upon the calculated position of rotating body 102. Microprocessor 118 determines whether gripper arms 172 are approaching a placing phase apex position. At the placing phase apex position, gripper arms 172 are at their outermost positions with respect to axis 162. If gripper arms 172 are approaching the placing phase apex position, as represented by decision block 188, microprocessor 118 controls motor 108a so that center gear 112a is rotated at a less than 2:1 counter rotation ratio. This is represented by process block 190.

As represented by input block 192, microprocessor 118 continues to receive signals from sensor 149a representing the position of gripper arms 172. Based upon this information, as represented by decision block 194, microprocessor 118 determines whether gripper arms 172 are at the placing phase apex position. Once microprocessor 118 determines that gripper arms 172 are at the placing phase apex position, microprocessor 118 electronically controls motor 108a to rotate center gear at a greater than 2:1 counter rotation ratio. This is represented by process block 196. Consequently, gripper arms 172 and gripper devices 174b have an advancing motion profile approximately the same as the advancing movement of the moving object.

As represented by input block 198, microprocessor 118 continues to receive signals from sensor 149a representing the position of gripper arms 172. Based upon this information, as represented by decision block 200, microprocessor 118 determines whether the article has been placed upon the moving object. As represented by process block 202, once microprocessor 118 determines that the article has been placed in the moving object, microprocessor 118 controls motor 108a to vary the rotational velocity of center gear 112a so that center gear 112a is rotated at a less than 2:1 counter rotation ratio.

As shown by input block 204, microprocessor 118 continues to receive signals from sensor 119b representing the position of gripper arms 172. Based upon the signals, microprocessor 118 determines whether gripper arms 172 are again in phase with the fixed point motion profile. This is represented by decision block 206. Once microprocessor 118 determines that gripper arms 172 are again in phase with the fixed point motion profile, microprocessor 118 controls motor 108a to vary the rotational velocity of center gear 112a so that center gear 112a again rotates at a 2:1 counter rotation ratio as represented by process block 184.

Microprocessor 118 also controls motor 108b to vary the rotational velocity of center gear 112b. Thus, microprocessor 118 controls motor 108b so that the second pair of rotating planet assemblies (not shown) rotate with a fixed point profile during the picking phase and rotate with an advancing motion profile or matching motion profile during the placing phase.

Microprocessor 118 continues to control motor 148b so that center gear 112b is rotated at a fixed point, 2:1 counter rotation ratio during the picking phase. However, once microprocessor 118 determines that gripper arms 172 are approaching a placing phase apex position, microprocessor 118 again varies the rotational velocity of center gear 112a.

Microprocessor 118 also controls motor 108b to vary the rotational velocity of center gear 112b. Thus, microprocessor 118 controls motor 108b so that the second pair of rotating planet assemblies (not shown) rotate with a fixed point profile during the picking phase and rotate with an advancing motion profile or matching motion profile during the placing phase.

Although the present invention has been described with reference to preferred embodiments, workers skilled in the art will recognize that changes may be made in form and detail without departing from the spirit and scope of the invention.

What is claimed is:

1. A rotary transfer device for placing articles on objects, the device comprising:
    a main rotating body;
    means for rotating the main rotating body about a first axis;
    a center gear for rotation about the first axis wherein the center gear continually rotates about the first axis in one direction;

a planetary gear for rotation with the main body and about a second axis the planetary gear being in rotational communication with the center gear;

means for driving the planetary gear about the center gear;

an article transfer mechanism for placing articles onto objects, the article transfer mechanism rotating with the planetary gear and having at least one apex position of travel; and motion control means for periodically varying rotational velocity of the center gear to vary rotational velocity of the planetary gear such that the velocity of each article to be placed matches the velocity of the object on which it is to be placed at the time of its placement.

2. The device of claim 1 wherein the motion control means comprises a stepper motor in communication with the center gear.

3. The device of claim 1 further including synchronizing means for coordinating the rotation of the center gear and the main body.

4. The device of claim 1 further including main body position sensing means for detecting positions of the main body.

5. The device of claim 4 wherein the position sensing means comprises:

a rotary encoder coupled to a means for rotating the main rotating body and an index coupled at a known point to the main body.

6. The device of claim 1 further including center gear position sensing means for detecting positions of the center gear.

7. The device of claim 6 wherein the center gear position sensing means comprises:

a center gear encoder coupled to the motion control means and an index coupled to a fixed point on the center gear.

8. The device of claim 1 wherein the means for rotating the main rotating body comprise:

a drive cylinder coupled to the main rotating body and centered along the axis; and motor means for driving the drive cylinder.

9. The device of claim 1 further including an intermediate gear coupled between the center gear and the planetary gear.

10. The device of claim 1 wherein the article transfer mechanism comprises a gripper arm coupled to the planetary gear.

11. An apparatus for placing articles onto moving objects positioned on conveyor means, the apparatus comprising:

a main body for rotation about an axis;

an article transfer mechanism for traveling in orbital motion with apex positions about the axis; and a center gear for rotation about the axis, the center gear continuously rotating about the axis in one direction;

a planetary gear coupled between the center gear and the article transfer mechanism, the planetary gear being in rotational communication with the center gear; and motion control means for electronically varying rotational velocity of the center gear to vary rotational velocity of the planetary gear such that the velocity of each article to be placed matches the velocity of the object on which it is to be placed at the time of its placement.

12. The apparatus of claim 11 wherein the motion control means comprises a stepper motor in communication with the center gear.

13. The apparatus of claim 11 further including position sensing means for sensing positions of the main body and the article transfer mechanism.

14. The device of claim 11 further including synchronizing means for coordinating rotation of the main body and the article transfer mechanism so that the article transfer mechanism travels at approximately the same velocity as the moving objects when placing articles onto the moving objects.

15. The device of claim 11 further including an intermediate gear coupled between the center gear and the planetary gear.

16. The rotary transfer device for placing articles onto moving objects having a velocity, the device comprising:

a main rotating body;

means for rotating the main rotating body about a first axis;

a center gear for continuous rotational movement about the first axis in a single direction;

a planetary gear for rotation with the main rotating body and about a second axis, the planetary gear being in rotational communication with the center gear;

an article transfer mechanism for placing articles onto objects, the article transfer mechanism rotating with the planetary gear and having at least one apex position of travel; and motion control means for periodically varying the continuous rotational velocity of the center gear to vary rotational velocity of the planetary gear such that the velocity of each article to be placed matches the velocity of the object on which it is to be placed at the time of its placement.

17. The device of claim 16 wherein the motion control means comprises a stepper motor in communication with the center gear.

18. The device of claim 16 further including an intermediate gear coupled between the center gear and the planetary gear.

19. The device of claim 16 further including position sensing means for sensing positions of the main body and the article transfer mechanism.

20. The method of claim 16 further including synchronizing means for coordinating rotation of the main body and the article transfer mechanism so that the article transfer mechanism travels at approximately the same velocity as the moving objects when placing articles onto the moving objects.

21. The rotary device for placing articles onto moving objects, the device comprising:

a main rotating body;

means for rotating the main rotating body about an axis;

a center gear for rotational movement about the axis in one direction, the center gear having a radius;

a planetary gear for rotation with the main rotating body and in rotational communication with the center gear, the planetary gear having a radius substantially the same as the radius of the center gear;

an article transfer mechanism for placing articles onto the moving objects, wherein the article transfer mechanism is attached to the planetary gear such that it rotates with the planetary gear and having at least one apex position of travel; and motion control for varying the rotational velocity of the center gear to vary rotational velocity of the planetary gear such that the velocity of each article to be place matches the velocity of the object on which the article is to be placed.

22. The device of claim 21 wherein the motion control means comprises a stepper motor coupled to the center gear.

23. The device of claim 21 further including an intermediate gear coupled between the center gear and the planetary gear.

24. The device of claim 21 further comprising:
position sensing means for sensing positions of the main rotating body and the article transfer mechanism.

25. The device of claim 21 further including synchronizing means for coordinating rotation of the main rotating body and the article transfer mechanism so that the article transfer mechanism travels at approximately the same velocity as the moving objects when placing articles onto the moving objects.

26. The device of claim 1 wherein the motion control means comprises a servo motor in communication with the center gear.

27. The apparatus of claim 11 wherein the motion control means comprises a servo motor in communication with the center gear.

28. The device of claim 16 wherein the motion control means comprises a servo motor in communication with the center gear.

29. The device of claim 21 wherein the motion control means comprises a servo motor coupled to the center gear.

* * * * *